J. S. ISLAND.
APPARATUS FOR FIXATION OF ATMOSPHERIC NITROGEN.
APPLICATION FILED NOV. 15, 1917.
1,316,445.
Patented Sept. 16, 1919.
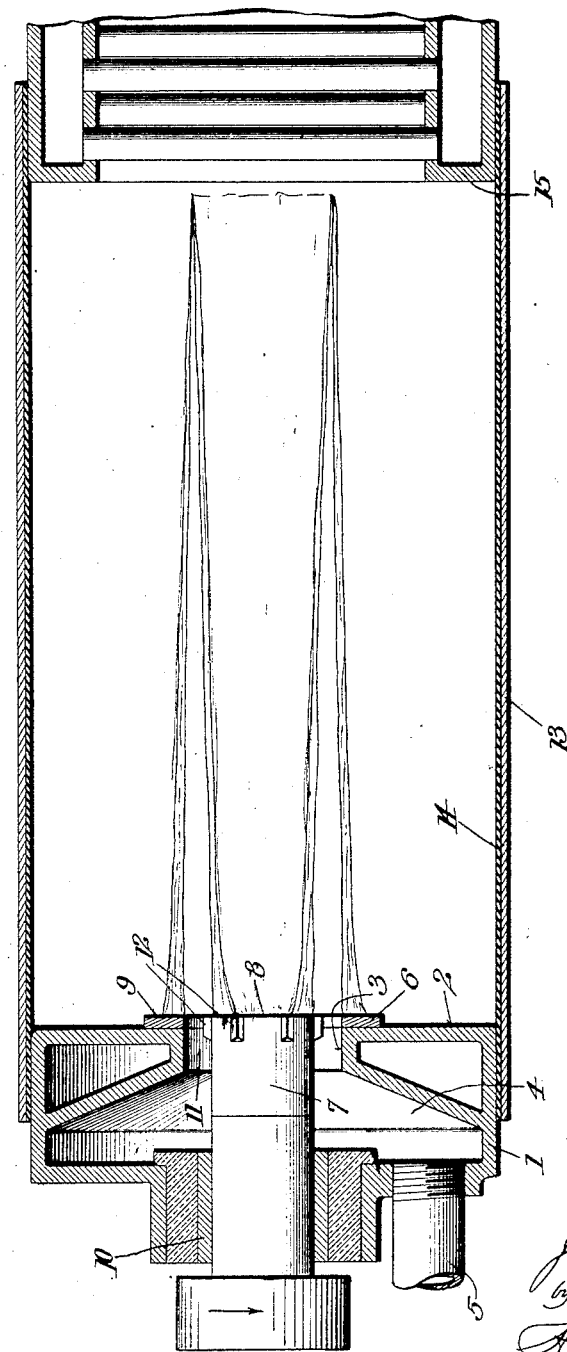

UNITED STATES PATENT OFFICE.

JAMES SIMPSON ISLAND, OF HAMILTON, ONTARIO, CANADA, ASSIGNOR OF SEVENTY PER CENT. TO EDWARD P. COLEMAN, OF HAMILTON, ONTARIO, CANADA.

APPARATUS FOR FIXATION OF ATMOSPHERIC NITROGEN.

1,316,445.     Specification of Letters Patent.     Patented Sept. 16, 1919.

Application filed November 15, 1917. Serial No. 202,228.

*To all whom it may concern:*

Be it known that I, JAMES SIMPSON ISLAND, a subject of the King of Great Britain, and resident of the city of Hamilton, county of Wentworth, Province of Ontario, in the Dominion of Canada, have invented certain new and useful Improvements in an Apparatus for Fixation of Atmospheric Nitrogen, described in the following specification and illustrated in the accompanying drawings, that form part of the same.

The principal object of this invention is to materially reduce the cost of producing oxids of nitrogen and to devise an apparatus which will produce conditions to effect the fixation and recovery of the maximum quantity of atmospheric nitrogen and which will require the minimum of attention in operation.

A further object is to devise an apparatus which will produce a continuous zone of electric flame with which the air is brought into association in such a manner as to create the maximum of flame area for a given electrical pressure.

A still further and important object is to devise a structure in which there are no delicate parts to get out of order and in which wear and deterioration are reduced to the minimum.

The principal feature of this invention consists in the novel construction and arrangement of parts whereby an annular passage is formed between the electrodes through which a current of air is directed to engage the annulus of flame, formed between the electrodes, midway between its points of emanation from said electrodes and effecting the distension of said flame in a double walled tubular formation projecting substantially in right angular relation to the outer faces of the electrodes, and whereby the resulting gases are liberated into an expanding cooling chamber.

The accompanying drawing is a longitudinal diagrammatic sectional view of a furnace constructed in accordance with this invention.

In the diagrammatic form of the device shown the electrode 1, is of cylindrical form having a flat outer face 2, and a central circular opening 3, of substantially cylindrical form leading from an annular chamber 4. Air is fed to the chamber 4 through a conduit 5 by means of a suitable fan or pump. An electrode ring 6 is detachably secured to the face 2 and surrounds the opening 3.

The inner electrode 7 is of substantially cylindrical form and is arranged centrally within the opening 3, the flat outer face 8 thereof being arranged substantially in the same plane as the outer face 9 of the electrode ring 6. The central electrode is supported in a bearing 10, suitably insulated from the outer electrode 1 and adapted to be rotated therein. It will thus be seen that a flow of air is directed outwardly through the annular space 11, formed between the inner and outer electrodes in a direction substantially at right angles to the outer flat faces of the electrodes.

The inner electrode 7 is preferably provided with a plurality of radial projections 12 to facilitate the starting of the electric arc and upon the rotation of this electrode a complete zone of electric flame is established at the outer end of the annular passage 11.

The outward flow of the air through the annular passage in a direction substantially at right angles to the outer faces of the electrodes engages the flame mid-way between its points of emanation from the electrodes distending it into a double walled tubular formation.

In actual test with a small apparatus the electric flame has been distended from the ends of the electrodes to a distance of about eighteen inches, with an electric energy of 52 kilowatts at 1600 volts across the arc. The consequence of this action is that the air is subjected to the electrothermal influence of the flame in an elongated annular strata. The densest and hottest portion of the flame is at its base or the points of emanation from the electrodes and the fixation of the nitrogen is mostly effected between the base and some point intermediate of the length of the flame and as the flame is distended it becomes thinner and cooler and with the influence of the constant flow of air the temperature is reduced in such a manner as to avoid a reversible reaction in the ionized gases.

A tubular casing 13 provided with a lining 14 of di-electric material is secured to and electrically insulated from the electrode 1 and extends outwardly therefrom to inclose the tubular flame and at the outer end of this casing is arranged a suitable cooler 15 which is here shown in the form of a tubular condenser.

The gases passing through the flame are thus liberated directly into an expanding cooling chamber which further reduces the temperature.

It is important that the terminal faces of the electrodes should be arranged in substantially the same plane and that the outer electrode should not extend beyond such plane in the direction of flow of the air, otherwise the pressure of air will cause the flame to follow such extension and result in the air forcing its way through the weaker part of the arc. The result of this would be a material difference in the oxidizing effect from that which is produced by having the flame distended uniformly from each electrode.

It must be understood that the drawings here shown are merely diagrammatic and that any details of construction may be altered without departing from the spirit of the invention.

This application is directed to substantially the same subject-matter as my pending application S. No. 199,615, filed October 31, 1917 and is substituted therefor.

Having thus described my invention what I claim and desire to secure by Letters Patent, is:

1. In an apparatus for the fixation of atmospheric nitrogen, a pair of electrodes having an annular space formed therebetween in which an annulus of electric flame is created, the opposing walls of said electrodes being so formed as to direct a current of air outwardly in a direction substantially at right angles to the outer face of said electrodes to effect the distension of said flame in a double walled tubular formation.

2. In an apparatus for the fixation of atmospheric nitrogen, a pair of electrodes having an annular space formed therebetween in which an annulus of electric flame is created, the outer faces of said electrodes being arranged in substantially the same plane and the opposing walls being so formed as to direct a current of air outwardly in a direction substantially at right angles to the outer face of said electrodes and to engage the annulus of flame midway of its points of emanation from the electrodes and distend said flame in a double walled tubular formation.

3. In an apparatus for the fixation of atmospheric nitrogen, an annular electrode having a flat outer face, and an electrode arranged centrally within the opening in the annular electrode and having a flat outer face arranged in substantially the same plane as the outer face of said annular electrode, said electrodes having their opposing faces formed to direct a current of air outwardly in a direction substantially at right angles to the flat faces of said electrodes and to engage an annulus of electric flame formed between said electrodes and distend it outwardly uniformly from each electrode into a double walled formation.

4. In an apparatus for the fixation of atmospheric nitrogen, a pair of electrodes having an annular space formed therebetween in which an annulus of electric flame is created, the opposing walls of said electrodes being so formed as to direct a current of air outwardly in a direction substantially at right angles to the outer face of said electrodes to effect the distention of said flame in a double walled tubular formation, and a tubular casing extending from the outer electrode and insulated therefrom, and forming an expanding cooling chamber.

5. In an apparatus for the fixation of atmospheric nitrogen, a pair of electrodes having an annular space formed therebetween in which an annulus of electric flame is created, the opposing walls of said electrodes being so formed as to direct a current of air outwardly in a direction substantially at right angles to the outer face of said electrodes to effect the distention of said flame in a double walled tubular formation, a tubular casing extending from the outer electrode and insulated therefrom, and a tubular cooling chamber arranged at the outer end of said tubular casing.

6. In an apparatus for the fixation of atmospheric nitrogen, an annular electrode having a flat outer face and its inner wall formed substantially cylindrical, a substantially cylindrical electrode centrally arranged in the opening in said outer electrode and forming with said outer electrode a substantially parallel walled annular passage, the outer flat face of said central electrode being arranged in substantially the same plane as the flat face of the annular electrode, and a tubular expanding and cooling chamber extending from said outer electrode and insulated therefrom.

In testimony whereof I affix my signature.

JAMES SIMPSON ISLAND.